(12) United States Patent
Kragness et al.

(10) Patent No.: US 9,243,401 B2
(45) Date of Patent: Jan. 26, 2016

(54) ACOUSTIC CEILING BOARD WITH IMPROVED AESTHETICS

(71) Applicant: ARMSTRONG WORLD INDUSTRIES, INC., Lancaster, PA (US)

(72) Inventors: Eric D. Kragness, Sinking Spring, PA (US); Chris Wells, Faversham (GB); Oliver Ebert, Emsdetten (DE); Alfred Winkler, Munster (DE)

(73) Assignee: AWI Licensing Company, Wilmington, DE (US)

( * ) Notice: Subject to any disclaimer, the term of this patent is extended or adjusted under 35 U.S.C. 154(b) by 60 days.

(21) Appl. No.: 14/280,362

(22) Filed: May 16, 2014

(65) Prior Publication Data

US 2015/0330072 A1    Nov. 19, 2015

(51) Int. Cl.
| | |
|---|---|
| *E04B 1/82* | (2006.01) |
| *E04B 1/84* | (2006.01) |
| *B32B 37/12* | (2006.01) |
| *B32B 37/24* | (2006.01) |
| *C03C 25/10* | (2006.01) |
| *E04B 1/74* | (2006.01) |

(52) U.S. Cl.
CPC . *E04B 1/84* (2013.01); *B32B 37/12* (2013.01); *B32B 37/24* (2013.01); *C03C 25/101* (2013.01); *B32B 2037/243* (2013.01)

(58) Field of Classification Search
USPC .......................... 181/290, 284, 286, 291, 294
See application file for complete search history.

(56) References Cited

U.S. PATENT DOCUMENTS

| | | | |
|---|---|---|---|
| 5,674,594 A * | 10/1997 | Sensenig | ................. B05D 7/06 |
| | | | 106/795 |
| 5,869,166 A | 2/1999 | Caldwell | |
| 6,103,360 A | 8/2000 | Caldwell et al. | |
| 7,033,963 B2 | 4/2006 | Felegi, Jr. et al. | |
| 7,294,363 B2 | 11/2007 | Grove, III et al. | |
| 7,745,357 B2 * | 6/2010 | Smith | ................. B28B 19/0092 |
| | | | 428/294.7 |
| 7,837,009 B2 * | 11/2010 | Gross | ...................... B32B 27/12 |
| | | | 181/208 |
| 7,879,433 B1 | 2/2011 | Felegi, Jr. et al. | |
| 8,100,226 B2 * | 1/2012 | Cao | ..................... B32B 37/1284 |
| | | | 181/284 |
| 8,178,449 B2 | 5/2012 | La Vietes et al. | |
| 8,182,652 B2 | 5/2012 | Englert et al. | |
| 8,210,310 B1 | 7/2012 | Yeung et al. | |
| 2005/0211500 A1 | 9/2005 | Wendt et al. | |
| 2008/0256879 A1 | 10/2008 | Babineau | |
| 2009/0178357 A1 * | 7/2009 | Francis | ................. E04F 13/042 |
| | | | 52/417 |
| 2011/0147119 A1 | 6/2011 | Cao et al. | |
| 2011/0284319 A1 | 11/2011 | Frederick et al. | |
| 2013/0216762 A1 * | 8/2013 | Chan | ...................... B32B 13/04 |
| | | | 428/70 |
| 2013/0291990 A1 * | 11/2013 | Nagarajan | ............. F16L 59/029 |
| | | | 138/140 |
| 2014/0224407 A1 | 8/2014 | Blanchard et al. | |

FOREIGN PATENT DOCUMENTS

| | | |
|---|---|---|
| EP | 0837960 B1 | 7/2000 |
| EP | 1403330 A1 | 3/2004 |
| WO | 2005094317 A2 | 10/2005 |
| WO | 2011087670 A2 | 7/2011 |
| WO | 2013014363 A1 | 1/2013 |

OTHER PUBLICATIONS

International Search Report for corresponding Application No. PCT/US2015/030684, Mailed Aug. 18, 2015. WO.

* cited by examiner

*Primary Examiner* — Edgardo San Martin
(74) *Attorney, Agent, or Firm* — Michael U. Lee

(57) ABSTRACT

Described herein are acoustical panels, comprising: a substrate; a non-woven veil having an airflow resistance of greater than 45 mks rayls, comprising: from about 20 wt. % to about 60 wt. % glass fibers; from about 40 wt. % to about 80 wt. % of a filler; and from about 110 dry g/m² to about 135 dry g/m² of a coating. Methods of making and using the panels are also described.

20 Claims, No Drawings

ACOUSTIC CEILING BOARD WITH IMPROVED AESTHETICS

FIELD OF THE DISCLOSURE

The present disclosure relates to building panels having improved visual and acoustical performance, and more particularly to ceiling boards that maintain or exceed visual performance with less paint.

BACKGROUND

Building panels are used in a variety of applications inside a building structure to create aesthetically and acoustically pleasing room environments. The building panels may be formed into panels that can be applied to the walls, ceilings (in some instances forming a suspended ceiling system), and canopies. In some applications, building panels have suitable aesthetics; however, such panels may not provide proper air flow or acoustical properties. In order for a panel to function effectively as a ceiling panel, it must be able to provide an aesthetically pleasing appearance while also providing sufficient air flow to enable appropriate acoustical properties.

Thus, there remains a need for building panels that provide a combination of aesthetics and acceptable acoustical performance. Embodiments of the present invention are directed to meeting these needs.

SUMMARY

In some embodiments, the present invention provides an acoustical panel, comprising: a substrate; a non-woven veil having an airflow resistance of greater than 45 mks rayls, comprising: glass fibers; and a filler; and from about 110 dry g/m$^2$ to about 135 dry g/m$^2$ of a coating.

In some embodiments, the present invention provides an acoustical panel, comprising: a substrate; a non-woven veil having an airflow resistance of greater than about 50 mks rayls, comprising: glass fibers; and a filler; and from about 110 dry g/m$^2$ to about 135 dry g/m$^2$ of a coating.

In some embodiments, the present invention provides an acoustical panel, comprising: a substrate comprising an inorganic fiber; and a coated non-woven veil having an airflow resistance of less than about 300 mks rayls.

Some embodiments provide a coated non-woven veil comprising: a non-woven veil having an airflow resistance of greater than 45 mks rayls, comprising: glass fibers; and a filler; and from about 110 dry g/m$^2$ to about 135 dry g/m$^2$ of a coating comprising: a binder; particles; and a carrier; wherein the coated non-woven veil has an airflow resistance of about 300 mks rayls or less.

Some embodiments provide a coated non-woven veil comprising: a non-woven veil having an airflow resistance of greater than about 50 mks rayls, comprising: glass fibers; and a filler; and from about 110 dry g/m$^2$ to about 135 dry g/m$^2$ of a coating comprising: a binder; particles; and a carrier; wherein the coated non-woven veil has an airflow resistance of about 300 mks rayls or less.

Some embodiments provide a method of improving the aesthetics of an acoustical panel, comprising: affixing to a substrate, a non-woven veil having an airflow resistance of greater than 45 mks rayls comprising: from about 20 wt. % to about 60 wt. % glass fibers; and from about 40 wt. % to about 80 wt. % of a filler; applying to the non-woven veil, from about 155 wet g/m$^2$ to about 200 wet g/m$^2$ of a coating comprising: a binder; particles having a d$_{50}$ of from about 50 microns to about 300 microns; and a carrier; and drying the coated non-woven veil. In some embodiments the coated non-woven veil is dried for a time and at a temperature effective to provide from about 110 dry g/m$^2$ to about 135 dry g/m$^2$ of the coating.

Some embodiments provide a method of improving the aesthetics of an acoustical panel, comprising: affixing to a substrate, a non-woven veil having an airflow resistance of greater than about 50 mks rayls comprising: from about 20 wt. % to about 60 wt. % glass fibers; and from about 40 wt. % to about 80 wt. % of a filler; applying to the non-woven veil, from about 155 wet g/m$^2$ to about 200 wet g/m$^2$ of a coating comprising: a binder; particles having a d$_{50}$ of from about 50 microns to about 300 microns; and a carrier; and drying the coated non-woven veil. In some embodiments the coated non-woven veil is dried for a time and at a temperature effective to provide from about 110 dry g/m$^2$ to about 135 dry g/m$^2$ of the coating.

In other embodiments, the present invention provides a method of improving the aesthetics of an acoustical panel, comprising: applying a coating comprising a binder; particles; and a carrier to a non-woven veil having an airflow resistance of greater than 45 mks rayls in an amount effective to provide from about 110 dry g/m$^2$ to about 135 dry g/m$^2$ of the coating; and affixing said coated non-woven veil to a substrate; wherein the coated non-woven veil has an airflow resistance of about 300 mks rayls or less.

In other embodiments, the present invention provides a method of improving the aesthetics of an acoustical panel, comprising: applying a coating comprising a binder; particles; and a carrier to a non-woven veil having an airflow resistance of greater than about 50 mks rayls in an amount effective to provide from about 110 dry g/m$^2$ to about 135 dry g/m$^2$ of the coating; and affixing said coated non-woven veil to a substrate; wherein the coated non-woven veil has an airflow resistance of about 300 mks rayls or less.

DETAILED DESCRIPTION

The features and benefits of the present invention are illustrated and described herein by reference to exemplary embodiments. This description of exemplary embodiments is intended to be read in connection with the accompanying drawings, which are to be considered part of the entire written description. In the description of embodiments disclosed herein, any reference to direction or orientation is merely intended for convenience of description and is not intended in any way to limit the scope of the present invention.

As used herein, terms such as "attached," "affixed," "connected," "coupled," "interconnected," and the like refer to a relationship wherein structures are secured or attached to one another either directly or indirectly through intervening structures, as well as both movable or rigid attachments or relationships, unless expressly described otherwise. Accordingly, the disclosure is not limited to such exemplary embodiments illustrating certain combinations of features that may exist alone or in combination with other features.

In some embodiments, the terms "board" and "panel" are used interchangeably.

As used herein, the term "about" is intended to encompass values that are within 10% of the value which the term modifies.

In some embodiments, the present invention provides an acoustical panel, comprising: a substrate; a non-woven veil having an airflow resistance of greater than about 50 mks rayls, comprising: glass fibers; and a filler; and from about 110 dry g/m$^2$ to about 135 dry g/m$^2$ of a coating.

In some embodiments, the present invention includes an acoustical panel having multiple layers. In some embodiments, the layers include a substrate, a veil, and a coating. In some embodiments, the layers include a substrate, an adhesive layer, a veil, and a coating.

In some embodiments, the substrate comprises a first major side and a second major side, the first major side being opposite to the second major side. In some embodiments, the first major side may be a front side which is facing towards a building space or room environment and the second major side may be a rear side which is concealed from view when the substrate is mounted.

Some embodiments provide that the substrate further includes peripheral lateral sides extending all the way around a core which collectively define a perimeter edge of the substrate that in turn defines a length and width. In some embodiments, the perimeter edge may have a square or rectangular edge profile, but other suitable edge profiles may be provided.

In some embodiments, the veil comprises an outward side and an inward side, the outward side being opposite to the inward side. In some embodiments, the outward side may be a front side which is facing towards a building space or room environment and the inward side may be a rear side which is concealed from view when the substrate is mounted.

In some embodiments, the first major side of the substrate is joined to the inward side of the veil with an adhesive. In some embodiments the adhesive may be a pressure sensitive adhesive, a hot melt adhesive, or a combination thereof. In some embodiments, the adhesive comprises a hot melt adhesive. In some embodiments, the adhesive comprises a pressure sensitive adhesive. In some embodiments, the adhesive comprises polyvinyl acetate. In some embodiments, the adhesive comprises ethylene vinyl-acetate (EVA).

In some embodiments, the coating may be applied to outward side of the veil. In some embodiments, the coating may be applied to the outward side of the veil before or after the veil is adhered to the first major side of the substrate. In some embodiments, the outward side of the veil to which a coating is applied is referred to as the "outward surface".

In some embodiments the substrate may be formed from an inorganic fiber. Some embodiments provide that the fiber may be selected from mineral wool, slag wool, rock wool, fiberglass, and a combination of two or more thereof. In some embodiments, the substrate may be formed from an organic fiber, such as cellulosic fibers selected from wood fibers, paper fibers, or cotton linters. In some embodiments, the inorganic fiber and/or the organic fiber may come from a recycled source.

In some embodiments, the inorganic fiber is added to the coating to improve sound absorption and to provide hardness and durability. In some embodiments, mineral wool may be used as the inorganic fiber due to its fire-resistance and because it does not serve as a food source for vermin, molds or bacteria. In other embodiments, granular or nodulated wool may be convenient because it is pourable and free-running—nodulated wool is also formed from mineral wool fibers in the pulp mixer. In some embodiments, nodulated wool is in the form of small, porous balls of irregular shape, such as the size of a pea or larger, often having a diameter in the range of about 0.1 mm to about 6 mm.

In some embodiments, the amount of the fibrous filler used is at least about 65 wt. % based on the dry solids weight of the substrate, but can also vary from about 65 wt. % to about 90% wt. % by weight based on the dry solids weight of the substrate. In some embodiments, the fiber length may range from about 1 mm to about 4 mm.

In some embodiments, the substrate may include non-fibrous fillers, such as kaolin clay, calcium carbonate, limestone, silica, vermiculite, ball clay or bentonite, talc, mica, gypsum, perlite, titanium dioxide, sand, barium sulfate, dolomite, polymers, wollastonite, calcite, aluminum trihydrate, pigments, zinc oxide, and zinc sulfate. In some embodiments the substrate may include from about 0 wt. % to about 25 wt. % of the non-fibrous filler. In another embodiment, the substrate may comprise expanded perlite in an amount ranging from about 0.1 wt. % to about 50 wt. % based on the weight of the substrate.

In some embodiments, the substrate may comprise a binder. Some embodiments provide that the binder may be selected from granular starches, polymers, and a combination thereof. In some embodiments the substrate may include between about 1 wt. % to about 35 wt. % of binder. In some embodiments the substrate may include between about 3 wt. % to about 10 wt. % of binder. In some embodiments the substrate may include between about 4 wt. % to about 6 wt. % of binder.

The granular starches may include pearl cornstarch, wheat starch, and potato starch. In some embodiments, the polymers may be produced from one or more of the following monomers vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methylacrylate, styrene, butadiene, epoxy, melamine. In some embodiments, the polymers may include polyurethanes, polyesters, polyethers, polystyrene, natural and modified natural polymers, polyvinyl chloride, polyvinyl alcohol, polyvinyl acetate, polymethyl methacrylate, and other acrylate or vinyl polymers. In some embodiments, the polyurethanes are derived from a di or poly-functional isocyanate compound and a di or poly-functional hydroxyl-compound. In some embodiments, the polyesters are derived from a di or poly-functional hydroxyl compound and a di or poly-functional carboxylic acid compound or anhydride compound.

In some embodiments, the substrate may further include additional additives such as dispersants, flocculants, defoaming agents, fungicides, biocides, and a combination thereof.

In some embodiments, the substrates may be formed via a conventional wet-felting process and then sanded to have a thickness in the range of about one-half inch to about 1 inch. Specifically, in some embodiments, the substrate may be prepared by mixing together the aforementioned ingredients with an amount of water necessary to provide slurry consistency in conventional mixing and holding equipment. In some embodiments, the ingredients may be mixed together using a high-shear mixer. High mixing speeds may be used to create the high-shear conditions that degrade non-woven fabric to a large degree by separation of the individual fibers. In other embodiments, the high shear mixing degrades mineral wool by breaking it down into shorter fibers even when no or few nodules are present, resulting in a smooth coating being formed.

In some embodiments, the substrate may be prepared by air-lay or direct-lay or other methods known in the art for preparing substrates as described herein.

In some embodiments, the acoustical performance properties of a panel are enhanced by perforation (pin punching), wheel abrading, embossing or eroding the facing surface of the board. Without these performance enhancing features, conventional coated acoustical panels may not be able to attain the desired acoustical performance characteristics.

In some embodiments the non-woven veil may include fibers, filler, binder, or a combination thereof. In some embodiments, the non-woven veil may having a thickness ranging from about 0.2 mm to about 0.5 mm; alternatively a thickness of about 0.4 mm. In some embodiments, the non-woven veil has a basis weight of from about 100 g/m$^2$ to about 150 g/m$^2$; alternatively the non-woven veil has a basis weight of about 125 g/m$^2$.

In some embodiments the fibers may include glass fibers, wood fibers, and a combination thereof. In some embodiments, the fibers may have an aspect ratio from about 10:1 to about 1:10. In some embodiments the fibers may include glass fibers, wood fibers, and a combination thereof. In some embodiments, the fibers may have an aspect ratio from about 5:1 to about 1:5. In some embodiments the fibers may include glass fibers, wood fibers, and a combination thereof. In some embodiments, the fibers may have an aspect ratio from about 4:1 to about 1:2. In some embodiments, the fibers may be 3-9 mm in length.

In some embodiments the binder comprises an ingredient selected from polyvinyl alcohol, starch, a cellulosic resin, a polyamide, a polyacrylamide, a polyester, a polyolefin, a water soluble vegetable gum, urea-formaldehyde, melamine-formaldehyde, a melamine-phenol-formaldehyde copolymer, an acrylic copolymer, and a combination of two or more thereof. In some embodiments, the polyolefins include polypropylene and polyethylene.

In some embodiments, the non-woven veil comprises a filler selected from: calcium carbonate, aluminum trihydrate (ATH), magnesium hydroxide, dolomite, dolomitic limestone, and combinations thereof. In another embodiment, the filler may also include nitrogen-phosphorous based flame retardants, such as intumescent nitrogen-phosphorous compounds, organic nitrogen-phosphorous compounds, inorganic nitrogen-phosphorous compounds, melamine based products such as melamine-formaldehyde, melamine-polyphosphate, melamine cyanurate, melamine-phosphate, melamine-phenol-formaldehyde copolymers, acrylic copolymers, and bromine and chlorine halogenated fillers and/or resins optionally combined with antimony trioxide or antimony pentoxide synergists.

In some embodiments, the non-woven veil may further comprise a thickener or a whitener. Some embodiments provide that the thickener prevents particle settling and provides resistance to shear or elongation rate striation markings that may arise under processing conditions. According to one embodiment, thickeners may be present in an amount of about 0.1 wt. % to about 5 wt. % based on the solid binder content. In some embodiment, thickener may include a polyurethane copolymer, hydroxyethyl cellulose, a polyacrylamide, or a pH dependent thickeners, such as polyacrylates.

In some embodiments, the filler will be substantially spherical and range in size from about 0.1 to about 600 microns. In some embodiments, the filler will range in size from about 1 micron to about 500 microns. In some embodiments, the filler will range in size from about 10 microns to about 400 microns. In some embodiments, the filler will range in size from about 50 microns to about 300 microns. In some embodiments, the filler will range in size from about 200 microns to about 450 microns. In some embodiments, the filler comprises from about 35% to about 90% by weight of the veil composition on a dry solids basis.

According to one embodiment of the present invention, the filler occupies volume in the non-woven veil that would be otherwise occupied by fiber or binder. According to another embodiment of the present invention, the filler enlarges voids already present between the fiber and/or binder in the non-woven veil. In some embodiments, the presence of filler may allow for more air to flow through the non-woven veil of the present invention when compared to a non-woven veil that contains less filler (but more fiber and/or binder) than the non-woven veils of the present invention. Thus, in some embodiments, the addition of filler throughout the non-woven veil facilitates airflow through the acoustical panel. In some embodiments, the addition of filler to the non-woven veil creates a greater number of air-passageways through the non-woven veil and/or enlarges the air-passageways that would otherwise be present without the addition of filler. In some embodiments, the increased airflow through the non-woven veil enhances the acoustical performance.

In some embodiments, the addition of filler will result in an air flow resistance of greater than 45 mks rayls for the uncoated non-woven veil. In some embodiments, the addition of filler will result in an air flow resistance of greater than about 50 mks rayls for the uncoated non-woven veil. In some embodiments, the addition of filler will result in an air flow resistance of from about 50 mks rayls to about 150 mks rayls for the uncoated non-woven veil. In some embodiments, the addition of filler will result in an air flow resistance of from about 50 mks rayls to about 75 mks rayls for the uncoated non-woven veil. In some embodiments, the addition of filler will result in an air flow resistance of from about 51 mks rayls to about 56 mks rayls for the uncoated non-woven veil. In some embodiments, the addition of filler will result in an air flow resistance of from 52 mks rayls to 53 mks rayls for the uncoated non-woven veil. In some embodiments, the addition of filler will result in an air flow resistance of about 52 mks rayls for the uncoated non-woven veil. In some embodiments, a non-woven veil exhibiting this level of airflow resistance will allow sound to pass through the material at a rate especially desirable for using the non-woven veil as an acoustical facing for a sound absorbing panel.

In some embodiments, the airflow resistance of coated veils is measured after the coated veil is peeled from the finished product.

In some embodiments, the non-woven veil may be formed by mixing together binder and filler with a liquid carrier—such as hot water—followed by the addition of dispersed fibers and other additional ingredients—such as an anionic polyacrylamide, dispersant, defoamer, and biocide.

In some embodiments the binder may be present in an amount ranging from about 0.1 wt. % to about 30 wt. % based on the weight of the non-woven veil. In some embodiments the binder may be present in an amount ranging from about 1 wt. % to about 20 wt. % based on the weight of the non-woven veil. In some embodiments the binder may be present in an amount ranging from about 5 wt. % to about 15 wt. % based on the weight of the non-woven veil.

In some embodiments the non-woven fiber may be present in an amount ranging from about 20 wt. % to about 60 wt. % based on the weight of the non-woven veil. In some embodiments the non-woven fiber may be present in an amount ranging from about 25 wt. % to about 50 wt. % based on the weight of the non-woven veil.

In some embodiments the filler may be present in an amount ranging from about 40 wt. % to about 80 wt. % based on the weight of the non-woven veil. In some embodiments the filler may be present in an amount ranging from about 50 wt. % to about 75 wt. % based on the weight of the non-woven veil. In some embodiments, the filler is present in the amount of about 70 wt. % of the non-woven veil.

Randomly dispersed fiber orientation and filler throughout the non-woven veil is preferred for two reasons: (1) the resulting non-woven veil is capable of installation in any direction without preferential markings and (2) the particles are generally distributed throughout the non-woven veil volume in a generally homogenous fashion, thereby maximizing the amount of even air flow through the voids created or enlarged by the addition of the filler.

In some embodiments, the coating composition of the present invention may include a binder, particles and a carrier.

Some embodiments provide that the particles may have sufficient size to impart physical texture to the outward side (or surface) of the non-woven veil and/or aesthetic properties to the outward, or top, surface of the non-woven veil. In some embodiments, the particles will have a size sufficient to impart desired aesthetic properties while tending not to completely plug or seal the openings within the non-woven veil or substrate.

In some embodiments, particles may include calcium carbonate, dolomite, dolomitic limestone, kaolin clay, mica, talc, silica, titanium dioxide, barium sulfate, perlite, gypsum, wollastonite, calcite, aluminum trihydrate, zinc oxide, zinc sulfate, polymers, other various pigments and combinations thereof.

In some embodiments, the particles will be substantially spherical and have a $d_{50}$ ranging from about 0.1 to about 600 microns. In some embodiments, the particles have a $d_{50}$ ranging from about 1 micron to about 500 microns. In some embodiments, the particles have a $d_{50}$ ranging from about 10 microns to about 400 microns. In some embodiments, the particles have a $d_{50}$ ranging from about 50 microns to about 300 microns. In some embodiments, the particles have a $d_{50}$ ranging from about 200 microns to about 450 microns. In some embodiments, the particles have a $d_{50}$ ranging from about 10 microns to about 150 microns.

In some embodiments, the particles are homogeneously distributed throughout the coating.

In some embodiments, the particles may constitute from about 1 wt. % to about 99 wt. % of the coating composition on a dry solids basis. In some embodiments, the particles may constitute from about 15 wt. % to about 95 wt. % of the coating composition on a dry solids basis. In some embodiments, the particles may constitute from about 35 wt. % to about 90 wt. % of the coating composition on a dry solids basis.

In other embodiments, the coating may further comprise dispersants, defoamers and viscosity modifying agents—such as thickening agents or thinning agents. In some embodiments, the coating comprises tetrasodium pyrophosphate as a dispersing agent. In another embodiment, the coating may comprise hydroxyethyl cellulose as a thickener.

In some embodiments the binders which can be used with the present invention include epoxies, urethanes, melamine, polyesters, acrylic latex, natural and modified natural polymers, and vinyl polymers. In some embodiments, the polymers can include one or more of the following monomers vinyl acetate, vinyl propionate, vinyl butyrate, ethylene, vinyl chloride, vinylidine chloride, vinyl fluoride, vinylidene fluoride, ethyl acrylate, methyl acrylate, propyl acrylate, butyl acrylate, ethyl methacrylate, methyl methacrylate, butyl methacrylate, hydroxyethyl methylacrylate, styrene, butadiene, urethane, epoxy, melamine, and an ester. Examples of natural and modified natural polymers are protein and carbohydrate polymers such as starch. In some embodiments, the binders may include polyurethanes, polyesters, polyolefins, polyvinyl chloride, and combinations thereof.

In some embodiments, the binder concentration of the coating may be in the range of from about 2 wt. % to about 30% wt. % based on the total weight of the coating. In some embodiments, the aqueous carrier may be water. In some embodiments, the coating may further comprise a dispersing agent that is present in the coating from about 0.5 wt. % to about 2.5% wt. % based on the total weight of the coating. In some embodiments, the coating may further comprise a thickener that may be present in an amount ranging from about 0.2 wt. % to about 2.5 wt. % based on the total weight of the coating.

In those embodiments wherein the particles include pigments, the binder concentration is such that the pigment to binder ratio is in the range from about 0.5:1 to about 90:1 on a dry solids basis. In some embodiments, the particles include pigments. In those embodiments wherein the particles include pigments, the binder concentration is such that the pigment to binder ratio is in the range from about 5:1 to about 30:1 on a dry solids basis. In some embodiments, the particles include pigments.

In some embodiments, the coating composition exhibits a viscosity in the range of from 5 cP to about 50,000 cP as measured on a Brookfield viscometer at 10 rpm. In some embodiments, the coating composition has a viscosity of up to about 10,000 cps. In another embodiment, the coating composition exhibits a viscosity in the range of from about 1100 cP to about 5000 cP as measured on a Brookfield viscometer at 10 rpm. Unless otherwise indicated, viscosity values refer to measurements taken at about 25° C.

In some embodiments, the present invention provides a coated non-woven veil comprising: a non-woven veil having an airflow resistance of greater than about 50 mks rayls, comprising: glass fibers; and a filler; and a coating comprising: a binder; particles; and a carrier; wherein the coated non-woven veil has an airflow resistance of about 300 mks rayls or less. In some embodiments, the coated non-woven veil comprises from about 110 dry g/m$^2$ to about 135 dry g/m$^2$ of the coating.

In certain embodiments, wherein a particular type of coating is being used and a particular type of substrate is being used, it may be desirable to include a coated non-woven veil having an airflow resistance of less than 600 mks rayls. It is preferred, however, that the coated non-woven veil has an airflow resistance of less than 500 mks rayls; even more preferred less than 375 Inks rayls; and still further preferred less than 325 inks rayls.

Other embodiments provide a method of improving the aesthetics of an acoustical panel, comprising: applying a coating comprising a binder; particles; and a carrier to a non-woven veil having an airflow resistance of greater than about 50 mks rayls in an amount effective to provide from about 110 dry g/m$^2$ to about 135 dry g/m$^2$ of the coating; and affixing said coated non-woven veil to a substrate; wherein the coated non-woven veil has an airflow resistance of 300 mks rayls or less.

In some embodiments, a mineral fiber substrate is prepared via welt felt method. In some embodiments, the substrate is sanded to a desired thickness. In some embodiments, the substrate is sanded to a thickness of from about 10 mm to about 30 mm. In some embodiments, the substrate is sanded to a thickness of about 20 mm. In some embodiments, the substrate is laminated with an uncoated non-woven veil between heated nip rolls using a pressure sensitive adhesive. In some embodiments, the laminated substrate is then sprayed with a coating comprising a binder, particles and a carrier. In some embodiments, the coated substrate is then dried by exposure to heat.

Other embodiments provide a method of improving the aesthetics of an acoustical panel, comprising: affixing to a substrate, a non-woven veil having an airflow resistance of greater than about 50 mks rayls comprising: from about 20 wt. % to about 60 wt. % glass fibers; and from about 40 wt. % to about 80 wt. % of a filler; applying to the non-woven veil, from about 155 wet g/m² to about 200 wet g/m² of a coating comprising: a binder; particles having a $d_{50}$ of from about 50 microns to about 300 microns; and a carrier; and drying the coated non-woven veil.

In some embodiments the coated non-woven veil is dried for a time and at a temperature effective to provide from about 110 dry g/m² to about 135 dry g/m² of the coating. In some embodiments, the coated non-woven veil is dried at room temperature. In some embodiments, the coated non-woven veil is dried at a temperature of from about 40° C. to about 150° C. In some embodiments, the coated non-woven veil is dried at a temperature of from about 75° C. to about 125° C. In some embodiments, the coated non-woven veil is dried at a temperature of from about 100° C. to about 110° C. In some embodiments, the coated non-woven veil is dried at a temperature of about 105° C.

In some embodiments the coated non-woven veil is dried for about 10 seconds to about 30 minutes. In some embodiments the coated non-woven veil is dried for about 20 seconds to about 15 minutes. In some embodiments the coated non-woven veil is dried for about 30 seconds to about 5 minutes. In some embodiments the coated non-woven veil is dried for about 45 seconds to about 2 minutes. In some embodiments the coated non-woven veil is dried for about 1 minute. In some embodiments the coated non-woven veil is dried at a temperature of 105° C. for about 1 minute.

Further embodiments provide a method of improving the aesthetics of an acoustical panel, comprising: affixing to a substrate, a non-woven veil having an airflow resistance of greater than about 50 mks rayls comprising: from about 20 wt. % to about 60 wt. % glass fibers; an from about 40 wt. % to about 80 wt. % of a filler; applying to the non-woven veil a coating comprising: a binder; particles having a $d_{50}$ of from about 50 microns to about 300 microns; and a carrier, in an amount effective to provide from about 110 dry g/m² to about 135 dry g/m² of the coating; and drying the coated non-woven veil.

In some embodiments, a coating described herein is applied to a non-woven veil prior to the non-woven veil being affixed to a substrate.

In some embodiments, the coating composition of the present invention can be applied in the form of atomized droplets to the outward surface of the veil. In some embodiments, the coating can be applied by spray, mist, fogs, clouds, or aerosol. In one embodiment, the coating may be applied by spray using a high volume low pressure (HVLP) spray gun that reduces the amount of clogging in the pore of the veil.

In one embodiment, the coating composition may be fed into a pressure tank that is fluidly coupled with an HVLP spray gun. The fluid tip or fluid nozzle used with the HVLP spray gun has an opening that is sufficiently large to allow the filler particles to pass there through without clogging the nozzle or spray gun. The coating is atomized by the spray gun and applied under pressure to the substrate. The HVLP spray gun provides a lower exit velocity to the coating composition than generally is provided by other air atomizing application methods, thereby minimizing bounce-back of the coating from the substrate and tending to generate larger droplets distributed in a more narrowly defined pattern. The HVLP spray apparatus tends to generate a discontinuous finish that exhibits a coarse texture and preserves the desired acoustical characteristics of the non-woven veil.

In some embodiments, the coating composition can be applied with the HVLP spray gun to the non-woven veil to form a single coat or layer that is then allowed to dry or is dried under heated conditions. In other embodiments, additional coats or layers of the coating composition can be applied on top of the first coat with a drying step conducted between each application step. In one embodiment, a finish coating may be applied over the coating layers containing the larger filler material.

Previously, difficulties arose when coating a substrate or a non-woven veil for the purpose of enhancing cosmetic appearance. Specifically, a pigmented coating may be applied to reduce or eliminate the appearance of small black holes that exist on the outward side of the non-woven veil. In some embodiments, the appearance of black holes—sometimes referred to as salt and pepper coloring—correlates with the hiding power of the non-woven veil. As the hiding power decreases, the more pronounced the appearance of salt and pepper coloring. Previously, pigmented coatings were applied to the outward face of the non-woven veil in an effort to minimize the amount of salt and pepper coloring. However, as a greater amount of coating is required to minimize or eliminate the salt and pepper coloring, the resulting non-woven veil exhibits sub-par air flow because the applied coating has clogged the voids and/or channels in the non-woven veil. Thus, previous attempts to enhance the aesthetics of non-woven veils by surface coating resulted in an offsetting detrimental impact on the sound absorption properties of the ceiling panel.

Some embodiments provide that the addition of filler within and through the non-woven veil reduce the amount of coating needed to eliminate or reduce the salt and pepper coloring. Specifically, filler embedded within and throughout the non-woven veil reduces the visibility of the black holes on the outward face of the veil. Thus, the filler embedded within the non-woven veil does not detrimentally impact air flow, while also creating an unexpected benefit of reducing the amount of coating required to reduce or eliminate the salt and pepper coloring on the outward side of the veil. In some embodiments the presence of filler within and throughout the non-woven veil allows for a discontinuous coating to be applied to the outward surface of the veil. In some embodiments, the non-woven veil is coated with from about 110 dry g/m² to about 135 dry g/m². In some embodiments, the non-woven veil is coated with from about 115 dry g/m² to about 130 dry g/m². In some embodiments, the non-woven veil is coated with from about 115 dry g/m² to about 125 dry g/m². In some embodiments, the non-woven veil is coated with about 120 dry g/m². In some embodiments, the non-woven veil is coated with 118 dry g/m².

In some embodiments, the acoustic ceiling panel may be formed into a plurality of configurations as desired for a given application sound absorption and aesthetic needs, including for example, without limitation, polygonal, square, ellipsoidal, circle, hexagon, trapezoid, etc., and with various side profiles including flat, convex, concave, and combinations thereof. Accordingly, the invention is not limited by the shape of the acoustical substrate.

Some embodiments of the present invention provide a non-woven veil that demonstrates a hiding power value of greater than 75%. Some embodiments of the present invention provide a non-woven veil that demonstrates a hiding power value of greater than 80%. Other embodiments provide a non-woven veil that demonstrates a hiding power value of greater than 85%. Further embodiments provide a non-woven veil that demonstrates a hiding power value of greater than 90%. Still further embodiments provide a non-woven veil that demonstrates a hiding power value of greater than 95%. While other embodiments provide a non-woven veil that demonstrates a hiding power value of greater than 98%.

The hiding power of a non-woven veil can be measured by placing the scrim on an Opacity Test Chart, such as the Opacity Chart Form N2A from the Leneta Company. The Opacity Chart includes both a white section and a black section over which the lightness of the scrim can be measured. Hiding power can be determined by dividing the lightness value of the black section by the lightness value of the white section.

Some embodiments provide an acoustical panel, comprising: a substrate; a non-woven veil that demonstrates a hiding power value of greater than 75%, comprising: from about 20 wt. % to about 60 wt. % glass fibers; and from about 40 wt. % to about 80 wt. % of a filler; and from about 110 dry g/m² to about 135 dry g/m² of a coating.

Other embodiments provide a coated non-woven veil comprising: a non-woven veil that demonstrates a hiding power value of greater than 75%, comprising: from about 20 wt. % to about 60 wt. % glass fibers; and from about 40 wt. % to about 80 wt. % of a filler; and a coating comprising: a binder; particles; and a carrier; wherein the coated non-woven veil has an airflow resistance of about 300 mks rayls or less.

Still further embodiments provide a method of improving the aesthetics of an acoustical panel, comprising: affixing to a substrate, a non-woven veil that demonstrates a hiding power value of greater than 75%, comprising: from about 20 wt. % to about 60 wt. % glass fibers; and from about 40 wt. % to about 80 wt. % of a filler; applying to the non-woven veil a coating comprising: a binder; particles having a $d_{50}$ of from about 50 microns to about 300 microns; and a carrier, in an amount effective to provide from about 110 dry g/m² to about 135 dry g/m² of the coating; and drying the coated non-woven veil.

The invention will be described in greater detail by way of specific examples. The following examples are offered for illustrative purposes and are not intended to limit the invention in any manner.

EXAMPLES

Example 1

The acoustical panels used to generate the data described in Table 1 (below) may be prepared according to the following process. A mineral fiber substrate is prepared via wet felt method. The substrate is sanded to a desired thickness. The substrate is then laminated with an aluminum trihydrate filled uncoated non-woven veil between heated nip rolls using a pressure sensitive adhesive. The laminated substrate is then sprayed with a coating comprising a binder, particles and a carrier. The coated substrate is then dried by exposure to heat.

Example 2

The airflow resistance and light reflectance of coated non-woven veils according to some embodiments of the present invention and comparative non-woven veils are evaluated. Airflow resistance is measured according to ASTM C-522 "Standard Test Method for Airflow Resistance of Acoustical Materials". Light Reflectance is determined using the X-Rite Model 964 Spectrophotometer, using illuminant type A with the 10 deg observer and with the 21.5 mm target window. Eight individual measurements are averaged for each reported value.

The results of these evaluations are described below in Table 1.

TABLE 1

| Example | Uncoated Veil Air Flow Resistance (mks rayls) | Coating Density (dry g/m²) | Coated Veil Air Flow Resistance (mks rayls) | Light Reflectance (%) |
| --- | --- | --- | --- | --- |
| Ex. I | 53 | 118 | 245 | >85 |
| Ex. II | 53 | 128 | 300 | >85 |
| Comp. Ex. I | 45 | 197 | 323 | >85 |
| Comp. Ex. II | 45 | 217 | 411 | >85 |
| Comp. Ex. III | 40 | 236 | 118 | <85 |

The data described in Table 1 (above) demonstrates that the inventive combination of a non-woven veil having an airflow resistance (uncoated) of greater than 45 mks rayls, and particular amounts of a coating comprising a binder and particles; provides a coated non-woven veil that delivers the desired aesthetics (light reflectance) and acoustical performance (airflow resistance). The data described in Table 1 also demonstrates that the comparative combinations of non-woven veils and a coating are not able to provide the desired combination of aesthetics and acoustical performance.

It is intended that any patents, patent applications or printed publications, including books, mentioned in this patent document be hereby incorporated by reference in their entirety.

As those skilled in the art will appreciate, numerous changes and modifications may be made to the embodiments described herein, without departing from the spirit of the invention. It is intended that all such variations fall within the scope of the invention.

The invention claimed is:

1. An acoustical panel, comprising:
   a substrate;
   a non-woven veil having an airflow resistance of greater than 45 mks rayls, comprising:
      from about 20 wt. % to about 60 wt. % glass fibers; and
      from about 40 wt. % to about 80 wt. % of a filler; and
      from about 110 dry g/m² to about 135 dry g/m² of a coating.

2. The panel of claim 1, wherein the non-woven veil demonstrates a hiding power value of greater than 75%.

3. The panel of claim 1, wherein the coated non-woven veil has an airflow resistance of about 300 mks rayls or less.

4. The panel of claim 1, wherein the filler comprises aluminum trihydrate.

5. The panel of claim 1, comprising about 120 dry g/m² of the coating.

6. The panel of claim 1, wherein the coating is not continuous.

7. The panel of claim 1, wherein the coating comprises a binder and particles.

8. The panel of claim 7, wherein the particles have a $d_{50}$ of from about 50 microns to about 300 microns.

9. The panel of claim 1, wherein the non-woven veil is affixed to the substrate using an adhesive.

10. The panel of claim 9, wherein the adhesive comprises a pressure sensitive adhesive.

11. The panel of claim 1, wherein the non-woven veil has a thickness of from about 0.2 mm to about 0.5 mm.

12. The panel of claim 1, wherein the substrate is substantially free of punch holes, wheel abrasions, embossing or erosion.

13. A coated non-woven veil comprising:
   a non-woven veil having an airflow resistance of greater than 45 mks rayls, comprising:
      from about 20 wt. % to about 60 wt. % glass fibers; and
      from about 40 wt. % to about 80 wt. % of a filler; and a coating comprising:
  a binder;
  particles; and
  a carrier;
  wherein the coated non-woven veil has an airflow resistance of about 300 mks rayls or less.

14. The veil of claim 13, comprising from about 110 dry g/m² to about 135 dry g/m² of the coating.

15. The veil of claim 13, wherein the carrier is an aqueous carrier.

16. The veil of claim 13, wherein the binder is selected from a natural polymer, a modified natural polymer, a synthetic polymer and a combination of two or more thereof.

17. The veil of claim 13, wherein the particles comprise a material selected from calcium carbonate, dolomite, titanium dioxide, barium sulfate, clay, mica, limestone, silica, talc, perlite, gypsum, wollastonite, calcite, aluminum trihydrate, zinc, a polymer, a pigment and a combination of two or more thereof.

18. The veil of claim 17, wherein the particles have a $d_{50}$ of from about 50 microns to about 300 microns.

19. A method of improving the aesthetics of an acoustical panel, comprising:
  affixing to a substrate, a non-woven veil having an airflow resistance of greater than 45 mks rayls comprising:
    from about 20 wt. % to about 60 wt. % glass fibers; and
    from about 40 wt. % to about 80 wt. % of a filler;
  applying to the non-woven veil a coating comprising: a binder; particles having a $d_{50}$ of from about 50 microns to about 300 microns; and a carrier, in an amount effective to provide from about 110 dry g/m² to about 135 dry g/m² of the coating; and
  drying the coated non-woven veil.

20. The method of claim 19, wherein the non-woven veil is affixed to the substrate by lamination using an adhesive.

* * * * *